United States Patent
Hudson et al.

(10) Patent No.: US 6,671,707 B1
(45) Date of Patent: Dec. 30, 2003

(54) METHOD FOR PRACTICAL CONCURRENT COPYING GARBAGE COLLECTION OFFERING MINIMAL THREAD BLOCK TIMES

(75) Inventors: Richard L. Hudson, Northamptom, MA (US); J. Eliot B. Moss, Amherst, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/421,430

(22) Filed: Oct. 19, 1999

(51) Int. Cl.$^7$ ............................................. G06F 17/30
(52) U.S. Cl. ........................................ 707/206; 709/100
(58) Field of Search .............................. 709/100, 316; 711/150–160; 707/206

(56) References Cited

U.S. PATENT DOCUMENTS

| | | | | |
|---|---|---|---|---|
| 4,979,810 A | * | 12/1990 | Ogasawara | 359/873 |
| 5,088,036 A | * | 2/1992 | Ellis et al. | 707/206 |
| 5,367,685 A | | 11/1994 | Gosling | |
| 5,668,999 A | | 9/1997 | Gosling | |
| 5,687,368 A | * | 11/1997 | Nilsen | 707/103 |
| 5,857,210 A | * | 1/1999 | Tremblay et al. | 707/206 |
| 5,909,579 A | | 6/1999 | Agesen et al. | |
| 5,930,807 A | * | 7/1999 | Ebrahim et al. | 707/206 |
| 6,341,293 B1 | * | 1/2002 | Hennessey | 707/206 |

OTHER PUBLICATIONS

Bacon, D.F.; Graham, S.L.; Sharp, O.J.; "Compiler Transformations for High–Performance Computing", ACM Digital Library[online]. ACM Computing Surveys, vol. 26, No. 4, Dec. 1994.

Armstrong, E.; HotSpot: A new breed of virtual machine, Javaworld [online]. Accessed on Jun. 22, 1999. Retrieved from:<http://www.javaworld.com/iw–03–1988/IW–03–hotspot.html>.

Cierniek, M.; Wei Li; "Briki: an optimizing Java compiler", IEEE/IEE Electronic Library [online]. Proceedings of IEEE Compcon '97, Feb. 23–26, 1997, pp. 179–184.

Hsieh, C.; Conte, M.; Johnson, T.; Gyllenhaal, J.; Hwu, W.; Compilers for improved Java performance≒. University of Illinois, Jun. 1997, pp. 67–75.

Jansen, T.; Metayer, D.L.; Thorn, T.; "Security and Dynamic Class Loading in Java: a Formalisation". IEEE/IEE Electronic Library [online]. Feb. 1998.

Bell, D.; "Make Java fast: Optimize!", Javaworld (online) . Accessed from internet on Jun. 22, 1999. Apr. 1997, Retrieved from:<http:/www.javaworld.com>.

Tyma, P.; "Tuning Java Performance". Dr. Dobb's Journal, Vol 21, No. 4, Apr. 1996, pp. 52–58.

Aho, A.V.; Sethi, R.; Ullman, J.; Compilers, Principles, Techniques, and Tools. Addison–Wesley Publishing Company, Reading, MA. Dec. 1985, pp. 1–24, 440–442.

Jones, R.; Lins, R.; "Garbage Collection: Algorithms for Automatic Dynamic Memory Management", John Wiley & Sons, New York, NY. 1996, pp. 1–41, 75–95.

Kramer, Douglas; "The Java Platform: A White Paper", JavaSoft, May 1996, pp. 5–24.

(List continued on next page.)

*Primary Examiner*—Zarni Maung
*Assistant Examiner*—George L. Opie
(74) *Attorney, Agent, or Firm*—Peter Lam

(57) ABSTRACT

A method for practical concurrent copying garbage collection offering minimal thread blocking times. The method comprises achieving dynamic consistency between objects in an old memory space and objects in a new memory space. Threads are allowed to progress during garbage collection and threads are flipped one at a time. No read barrier is required.

29 Claims, 10 Drawing Sheets

```
// Replicate object
// This simply "marks" the object p refers to
replicate-object (p) {
        mark-write-barrier (p);
}

// Forward object
// If the object is not forwarded, this allocates space and forwards it
// It also adds it to the dark gray set
forward-object (p) {
        if (old (p) && ! forwarded (p)) {
                - allocate N space for p; let the N address be pp
                - set p's forwarding address to be pp
                - install back pointer from pp to p
                - handle any associete Java lock
        }
}

// Scan slot
// This is called for each field f of each object p needing scanning.
// Assume p is in N space.
// It copies the field from the O space copy, calls forward-object, and
//      installs the N address.
scan-slot (p, f) {
        pp = unforward (p);
        copy-word (&(pp->f), & (p->f));
        forward-object (p->f);      //only if p->f is a pointer
        if (forwarded (p->f)) {
                v = p->f;
                vv = forward (v);
                compare-and-swap (&(p->f), v, vv)    // avoid race with mutator
        }
}
```

OTHER PUBLICATIONS

Nettles, S.; O'Toole, J.; Pierce, D.; Haines, N.; "Replication–Based Incremental Copying Collection," Carnegie Mellon University, CMU–CS–93–135, Apr. 1993, 8 pgs.

Nettles, S.M.; O'Toole, J.W.; "Real–Time Replication Garbage Collection," Carnegie Mellon University, PLDI 1993, 10 pgs.

Cheng, P.; Harper, R.; Lee, P.; "Generational Stack Collection and Profile–Driven Pretenuring," Carnegie Mellon University, PLDI '98, 12 pgs.

Chilimbi, T.M.; Larus, J.R.; "Using Generational Garbage Collection to Implement Cache–Conscious Data Placement" University of Wisconsin–Madison, Oct. 1998, 12 pgs.

Hudson, R.L.; Moss, J.E.B.; "Incremental Collection of Mature Objects," University of Massachusetts, Sep. 1992, 16 pgs.

Hosking, A.L.I Hudson, R.L.; "Remembered sets can also play cards," University of Massachusetts, Oct. 1993, pp. 1–8.

* cited by examiner

```
// Mark Phase Write Barrier
// Assume *p = q as the update is occurring
// The p slot may be in U or O, and likewise for the q object
// This write barrier applies only for pointer stores
mark-phase-write (p, q) {
    *p = q;
    mark-write-barrier (q) ;
} mark-write-barrier (q) {
    if (old (q) && ! marked(q)) {    // old && !marked means "white"
        mark(q);                      // old && marked means "non-white"
        add-to-gray-set(q);           // we record "gray" objects explicitly
    }
}
```

FIG. 4A

```
// Root-Mark Phase
for each slot u in U that can possibly refer to a C object do
    mark-write-barrier (*u) ;
```

FIG. 4B

```
// process pointer q, removed from the gray object list
for (each slot p in object q) do
    mark-write-barrier (*p);
```

FIG. 4C

```
// Flip Phase Write Barrier
// Assume p->f = q as the update is occurring
// The object p refers to may be in U, O, or N
// q may be a value or a pointer (omit forwarding for values)
// If q is a pointer, it may refer to U, O or N
flip-write (p, f, q) {
    p->f = q;
    if (forwarded (p)) {       // this is true for BOTH O and N copies!
        pp = forward (p) ;     // this follows O->N or N->O
        qq = q;
        if (old (qq)) qq = forward (qq);         // omit for non-pointers
        pp->f = qq;
    }
}
```

FIG. 4F

```
// Copy Phase Write Barrier:
// Slightly different actions for pointers and for non-pointers // Assume p->f = q is the desired update
// The object p referes to may be in U or O; likewise for q
copy-write (p, f, q) {
    p->f = q;
    copy-write-barrier (p, f, q);
} copy-write-barrier (p, f, q) {
    if (forwarded (p)) {
        pp = forward (p);
        qq = forward (q);          // if q is not a pointer, then qq = q
        pp->f = qq;                // note that we write first O then N
    }
}

// Helper routine for forwarding pointers
forward (p) {
    if (forwarded (p))
        return forwarding-address (p)
    else
        return p;
}
```

FIG. 4D

```
// Collector word copying algorithm
// Goal: copy *p to *q
// p points to an O space object field
// q points to the corresponding N space field
copy-word (p, q) {
    i = max-cycles ;            // max number of times to try non-atomic copy loop
    do {
        wo = *p;
        wn = forward (wo);      // if a value, use wn - wo instead
        *q = wn ;
        if (*p == wo) return;   // done if no change
    } while (--i > 0);
    wn = *q;
    wo = *p;
    wn2 = forward (wo);         // again, if a value use wn2 = wo instead
    compare-and-swap (q, wn, wn2);  // address, old-value, new-value
}
```

FIG. 4E

```
// Flip Phase Pointer Equality Test
// Assume p == q is the desired test
// The objects p and q refer to may be in U, O, or N
// Assume the p != 0, q != 0, and p != q (in the sense of bit patterns)
flip-pointer-equal (p, q) {
    if (old (p)) p = forward (p);
    if (old (q)) q = forward (q);
    return (p == q);
}
```

FIG. 4G

```
// Heap-Flip: U space pointer forwarding
// Assume p is the address of a U slot that may point into O
flip-heap-pointer (p) {
    q = *p;
    if (old (q))
        compare-and-swap (p, q, forward (q));    // avoid race with mutator
}
```

FIG. 4H

```
// Replicate Phase Write Barrier
// Assume we have p->f == q as the update is occurring
// The p slot may be in U or O, and likewise for the q object
// This write barrier applies to both pointer and non-pointer stores
replicate-phase-write (p, q) {
    *p = q;
    replicate-phase-write-barrier (p, f, q);
} replicate-phase-write-barrier (p, f, q) {
    copy-write-barrier (p, f, q);
    mark-write-barrier (q);    // only if q is a pointer
}
```

FIG. 4I

```
// Replicate object
// This simply "marks" the object p refers to
replicate-object (p) {
    mark-write-barrier (p);
}

// Forward object
// If the object is not forwarded, this allocates space and forwards it
// It also adds it to the dark gray set
forward-object (p) {
    if (old (p) && ! forwarded (p)) {
        - allocate N space for p; let the N address be pp
        - set p's forwarding address to be pp
        - install back pointer from pp to p
        - handle any associate Java lock
    }
}

// Scan slot
// This is called for each field f of each object p needing scanning.
// Assume p is in N space.
// It copies the field from the O space copy, calls forward-object, and
//    installs the N address.
scan-slot (p, f) {
    pp = unforward (p);
    copy-word (&(pp->f), & (p->f));
    forward-object (p->f);           //only if p->f is a pointer
    if (forwarded (p->f)) {
        v = p->f;
        vv = forward (v);
        compare-and-swap (&(p->f), v, vv)    // avoid race with mutator
    }
}
```

FIG. 4J

METHOD FOR PRACTICAL CONCURRENT COPYING GARBAGE COLLECTION OFFERING MINIMAL THREAD BLOCK TIMES

FIELD OF THE INVENTION

The present invention relates generally to the field of computer software optimization. More particularly, the present invention relates to a method for practical concurrent copying garbage collection offering minimal thread blocking times.

BACKGROUND OF THE INVENTION

The popularization of the World Wide Web has exacerbated a problem for software developers trying to create software for networked consumer devices. While millions of people around the globe are surfing the Internet and browsing web pages with their computers, not all of those computers are the same. One person may be using a Macintosh, another a PC, and yet another user a UNIX machine. Hence software developers may find it desirable to design computer programs that could support multiple host architectures and could allow secure delivery of its software components.

The Java programming language and environment is designed to meet the challenges of application development in the context of heterogeneous, network-wide distributed environments. A program written in the Java Language compiles to a bytecode file that can run wherever a Java Platform is present. This portability is possible because at the core of a Java Platform is a Java Virtual Machine. Java bytecodes are designed to operate on a Java Virtual Machine (VM). The Java Virtual Machine is an abstract computing machine that has its own instruction set and uses various memory areas.

FIG. 1 is a block diagram of the elements in a client computer system 100 equipped to interpret and compile Java class files. The client computer system 100 includes computer hardware 110 controlled by an operating system 120. The computer hardware further comprises of computer memory 112 and machine registers 114. The system 100 also includes a Java VM implementation 130 for executing code contained in Java class files 160.

In a networked environment, a user would first access a computer server through the network and download the desired Java class file(s) 160 into a client computer system 100. After each Java class file has been verified, the interpreter 132 begins interpreting the Java bytecodes of the class file 160 and thus the code is executed.

Alternatively, a Java "Just-In-Time" (JIT) compiler 134 compiles the Java class file and generates compiled Java code 140 in the form of native processor code. The compiled Java code 140 is directly executed on the computer hardware 110. In order to maintain the state of the Java VM 130 and make system calls, the compiled Java code 140 may make calls 150 into the Java VM 130. Likewise, the Java VM 130 calls 150 compiled Java code 140 to cause it to execute on the computer hardware 110.

Java was derived from the C++ programming language. Java includes some other important features from garbage collected languages (e.g., Smalltalk and LISP)—including automatic memory storage management. Garbage collected languages, such as Java, allow the system (garbage collector) to take over the burden of memory management from the programmer. When a program runs low on heap space, the garbage collector (GC) determines the set of objects that that program may still access. Objects in this set are known as live objects. The space used by objects that will no longer be accessed ("dead objects") is freed by the garbage collector for future use. An object is defined as a collection of contiguous memory locations, lying in a single region that can be addressed and accessed via references.

A reference, also called a pointer, is the address of an object. Objects do not overlap and may be relocated independently of one another by the collector. In some cases, an object corresponds to a Java object. Multiple low-level objects may also be used to represent a single Java object. One example of this is a Java object with complex monitor locking happening. An object may contain slots, non-slot data, or both. A slot is a memory location that may contain a reference (pointer) to an object. A slot may also refer to no object, i.e., contain the null pointer. Memory locations can be categorized into slots and non-slot data correctly and unambiguously.

FIG. 2A is a diagram of CPU activity in a multiprocessor system using a traditional garbage collection algorithm. The horizontal axis represents time while the vertical axis represents the useful application work. In traditional garbage collection algorithms, all of the threads have to stop. The garbage collector runs, performing garbage collection, and then the threads start up again. Hence there are large blocks of time when none of the CPUs is performing useful work and only one of the CPUs is doing the garbage collection work. The actual useful or mutator work is suspended. In FIG. 2A, the threads on CPU0 through CPU3 are suspended for time "Z" while the garbage collector is running on CPU0. The threads are blocked during garbage collection. Furthermore, threads can not be resumed until the garbage collection completes. The application threads resume execution when garbage collection stops. The thread stoppage may not appear dramatic in a system with a small number of processors. But in a multiprocessor computing system with eight or sixteen processors, the performance loss becomes an issue.

There are many algorithms for performing garbage collection. All the algorithms start with a set of roots that enumerate all objects in the heap that are directly reachable. A root is a slot whose referent object (if any), is considered reachable, along with all objects transitively reachable from the referent. The remaining objects in the heap are unreachable and can be reclaimed. One type of garbage collection is called conservative, or ambiguous roots, garbage collection. In conservative garbage collection, the garbage collector assumes all global variables, in registers or on the stack, are root slots even though some might hold integers, or floating point or string data. Another type of garbage collection is precise garbage collection. In precise garbage collection, the root set must unambiguously contain all reference values, or else memory errors will result. This is because precise garbage collection compacts the memory space by moving all the objects it finds to another memory region. The values in the root set must contain reference values since the garbage collector copies and moves the objects pointed to by references, and then updates the references correspondingly. If a value is mistakenly considered a reference value when it is not, a wrong piece of data will be moved, and/or a non-reference mistakenly modified, and program errors may occur.

Previous concurrent collection algorithms overlap some parts of collection with mutation, but still stop the world to "flip" (adjust, correct) all the mutator stacks and roots. A mutator thread performs application work. In a large server application, where there are perhaps hundreds of threads, thread stack flipping time can introduce unacceptable pauses.

SUMMARY OF THE INVENTION

A method for practical concurrent copying garbage collection offering minimal thread blocking times is described. The method comprises achieving dynamic consistency between objects in an old memory space and objects in a new memory space. Threads are allowed to progress during garbage collection and threads are flipped one at a time. No read barrier is required.

Other features and advantages of the present invention will be apparent from the accompanying drawings and from the detailed description that follows below.

BRIEF DESCRIPTION OF THE DRAWINGS

The present invention is illustrated by way of example and not limitations in the figures of the accompanying drawings, in which like references indicate similar elements, and in which:

FIG. 4A is pseudo-code for a write barrier including the write action;

FIG. 4B is pseudo-code for the Root-Mark Phase;

FIG. 4C is an algorithm that processes a gray set item;

FIG. 4D is code for a Copy Phase Write Barrier;

FIG. 4E is pseudo-code for a Collector Word Copying algorithm;

FIG. 4F is Flip Phase Write Barrier pseudo-code;

FIG. 4G is pseudo-code for implementing pointer equality tests for one embodiment;

FIG. 4H is code for checking and flipping each slot;

FIG. 4I is Replicate Phase Write Barrier pseudo-code; and

FIG. 4J are Replicate Object, Forward Object, and Scan Slot routines.

DETAILED DESCRIPTION

Figure 1:
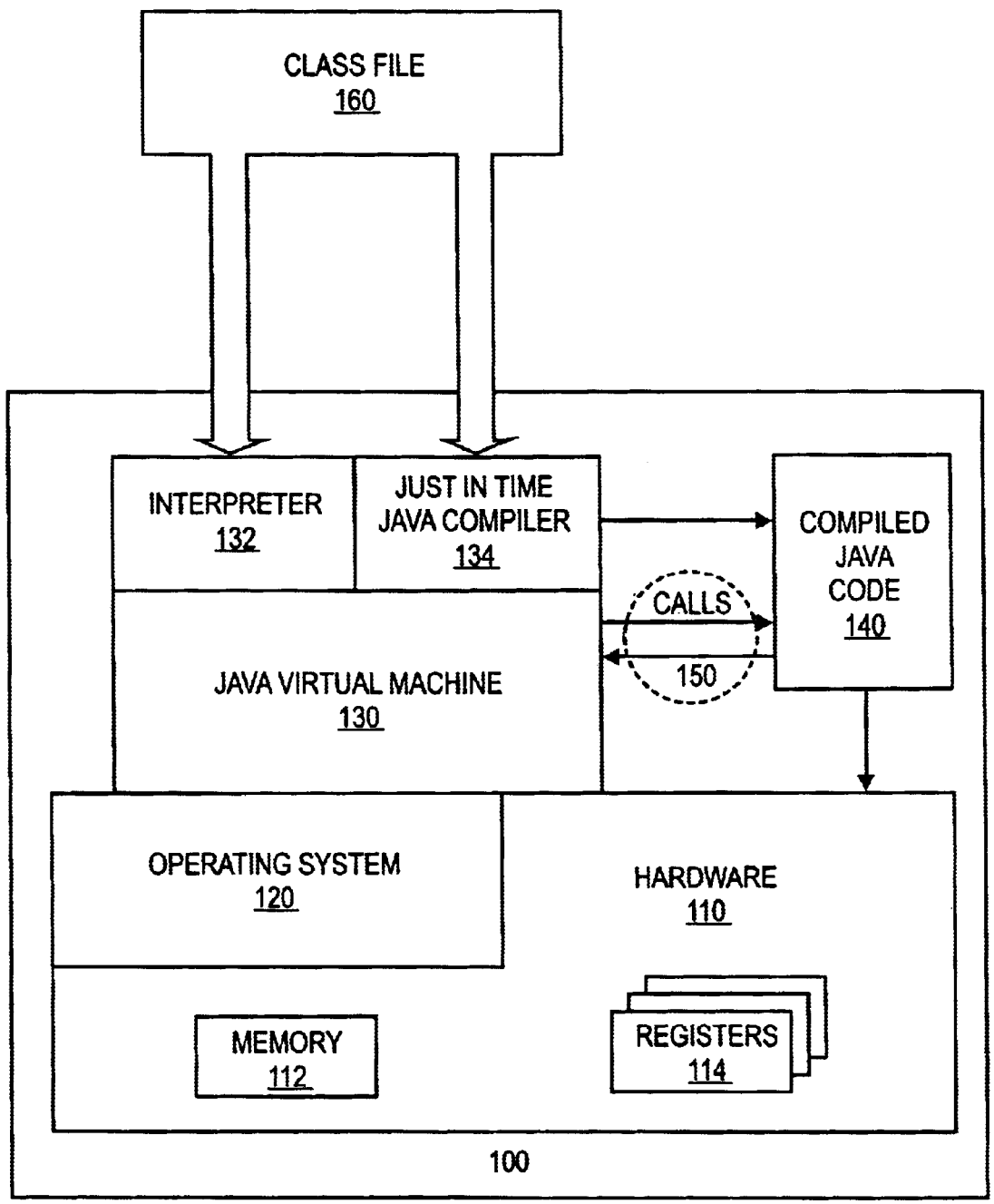
FIG. 1 is a block diagram of a Java Virtual Machine on a client computer system.

A method for practical concurrent copying garbage collection offering minimal thread blocking times is disclosed. The described architecture enables concurrent copying garbage collection. The embodiments described herein are described in the context of the Java object-oriented programming language, but is not so limited. Although the following embodiments are described with reference to Java and Java "Just-In-Time" (JIT) compilers, other embodiments are applicable to other types of programming languages. The same techniques and teachings of the present invention can easily be applied to other types of programming languages and systems.

The present enhancement is a new concurrent copying garbage collection (GC) algorithm. One intended advantage is to minimize the time during which any given application thread might be blocked during collection, and in particular to avoid blocking one thread because the collector is busy doing something with or to another thread. One problem this garbage collection algorithm addresses is the need for incremental "flipping" of threads. Flipping comprises changing slots referring to O objects (copies of objects before they are moved during collection) to refer to the corresponding N copies (copies of objects after they are moved during collection). Previous algorithms include a step during which all application threads are stopped, their stacks traversed, and pointers in the stacks redirected from old copies of objects to new copies. In systems that might have hundreds of threads, such a pause may be unacceptable to a user, and could possibly dominate interruptions of normal application work by the collector's activities.

Existing garbage collectors stop all threads while thread stacks are adjusted to account for copied objects, or in GC parlance, the "flip" to the new copies. Some incremental or concurrent copying collectors use read barriers involving conditionals. A read barrier comprises operations performed when loading a pointer or possibly when accessing its referent object. The operations are called a barrier because the operations must be performed before the pointer use proceeds, since the barrier may replace the pointer with another one, etc.

The present enhancement does not use read barriers. The present enhancement also interferes with mutator code less since writes are less frequent than reads. Copying can have advantages over mark-sweep GC algorithms because copying allows objects to be reordered and thus reclustered to improve cache and virtual memory performance. Copying may also avoid fragmentation.

Concurrent copying GC minimizes the amount of time any given application thread may need to block to support the collector. In particular, the present enhancement can operate in the presence of a large number of application threads on small- to medium-scale shared memory multiprocessors. Furthermore, the present enhancement avoids having one application thread block merely because the collector is busy doing something with another application thread. The present algorithm can offer the ability to "flip" one thread at a time (changing the thread's view from the old copies of objects to the new copies), as opposed to having to stop all threads and flip them at the same time.

Many concurrent GC algorithms use a read barrier to synchronize collector and application activities. Read barriers tend to incur significant overhead because of the frequency of reads. The present enhancement is more practical than previous algorithms because its novel techniques do not use a read barrier. The combination of minimal blocking and no read barrier makes the present enhancement suitable to multiprocessor server applications and to many real-time systems.

Languages that support threads and garbage collection make writing concurrent server applications easier, and thus have the potential for increasing demand for multiprocessors. Depending on the inherent data structures and algorithms of the application, a developer can add threads to scale a server up to process more requests, while plugging in more CPUs and memory to a multiprocessor backplane. Java allows programmers to write concurrent Web servers and similar applications with ease because Java has not only a thread model and automatic storage management, but also handy libraries. Also, the portability of Java encourages programmers to write multithreaded applications since there is less concern of being "locked in" to a particular hardware and software platform. A company that can produce the best price/performance on a multiprocessor may have an advantage.

Most GC algorithms alternate mutator computation with garbage collection. In order to collect the garbage collector has to "stop the world." While "stopping the world" results in a simpler implementation of the collector and the mutators, if one stops the world on a multiprocessor, then all mutator threads are stopped until the collector is done. This is undesirable for applications such as Web servers, which aim to provide quick response to a large volume of short queries or transactions.

Previous concurrent collection algorithms overlap some parts of collection with mutation, but still stop the world to flip all the mutator stacks and roots. In a large server application, where there are perhaps hundreds of threads, thread stack flipping time can introduce unacceptable pauses. The present enhancement may offer a solution that (a) does not stop all threads at once, since the collector can flip one thread stack at a time, and (b) minimizes the blocking time of any individual thread. A thread may have to wait to flip some, or all, of its own stack, but the thread does not wait for the collector to handle a large number of other threads. Both properties are important since the first one maintains overall throughput and the second prevents latency from varying too much.

Figure 2:
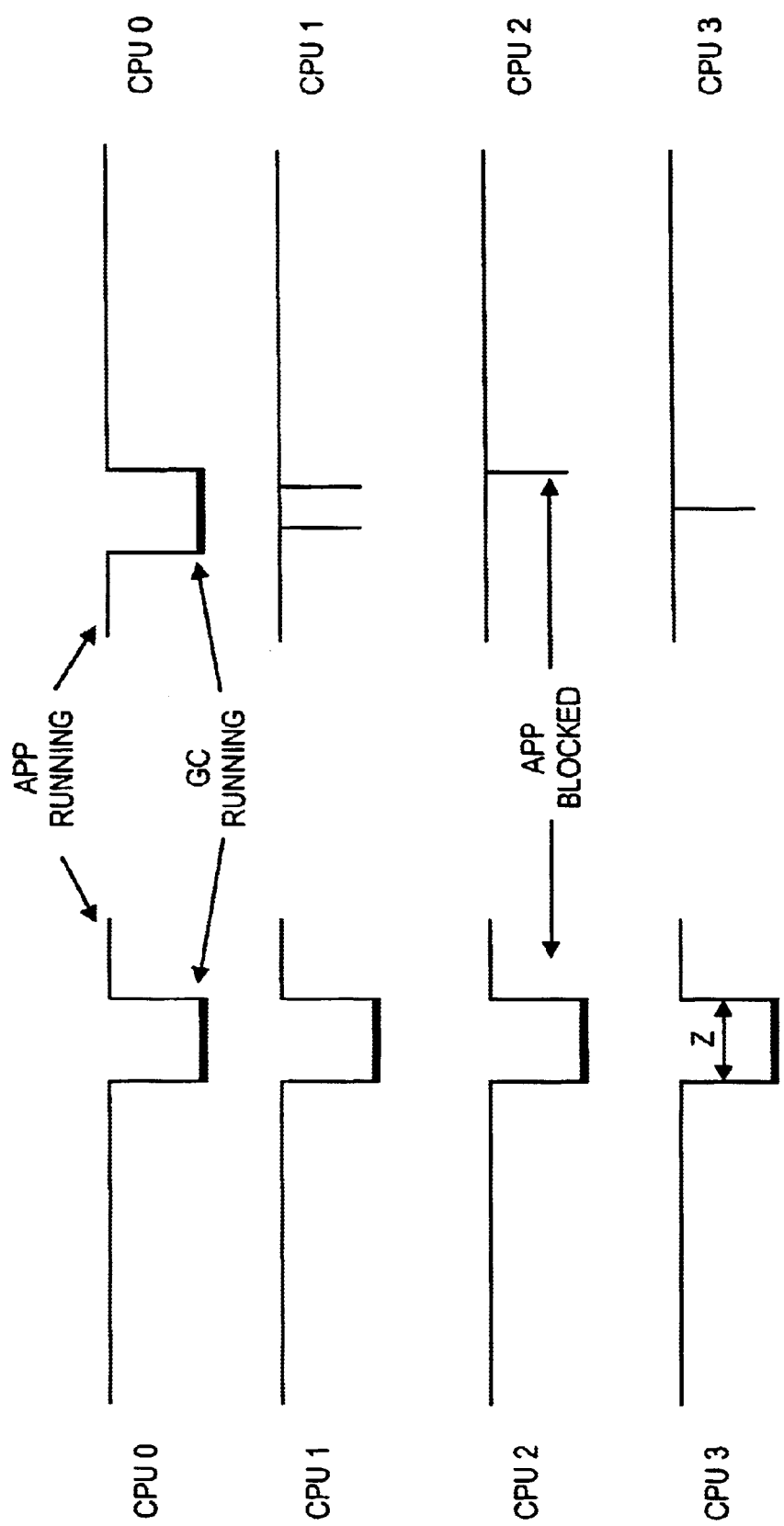
FIG. 2A is a diagram of CPU activity in a multiprocessor system using a traditional garbage collection algorithm.
FIG. 2B is a diagram of CPU activity in a multiprocessor system using a practical concurrent copying garbage collection algorithm offering minimal thread blocking times.

FIG. 2B is a diagram of CPU activity in a multiprocessor system using a practical concurrent copying garbage collection algorithm offering minimal thread blocking times. In the present enhancement, not all of the application threads have to be stopped during garbage collection. Since the threads are not suspended, the threads continue running and doing useful work. The application threads may need to do a little bit of work for garbage collection, but do not have to stop until garbage collection is completed. Applications threads do not have to stop for another thread simply because the garbage collector is doing something with the other thread. In FIG. 2B, the thread on CPU0 is stopped to run the GC. However, the threads on CPU1 through CPU 3 can continue work. Note also that the thread stopped on CPU0 could make progress during garbage collection if the other CPUs time share among the runnable threads. During certain points of garbage collection, the threads on CPU1, CPU2, and CPU3 are blocked briefly. In particular, the application threads pause briefly to process their stacks. For one embodiment, the garbage collector goes to each application thread in sequential order. After collection is done on one thread, the thread is released to perform useful work. The GC moves on to the next thread.

One embodiment of the present enhancement is described with one thread performing the collector's algorithm. Thus, on a multiprocessor with k CPUs, the multiprocessing factor for mutators may drop from k to k-1 for a time while the collector is running, but the factor does not drop to 1 as it would for a stop-the-world collector. A mutator can interact with the collector when the mutator allocates, updates heap slots, and "flips" its stack from old-space to new-space. If the mutator threads generate collector work faster than one CPU can clean up, then more CPUs can be assigned to collection work.

Figure 3:
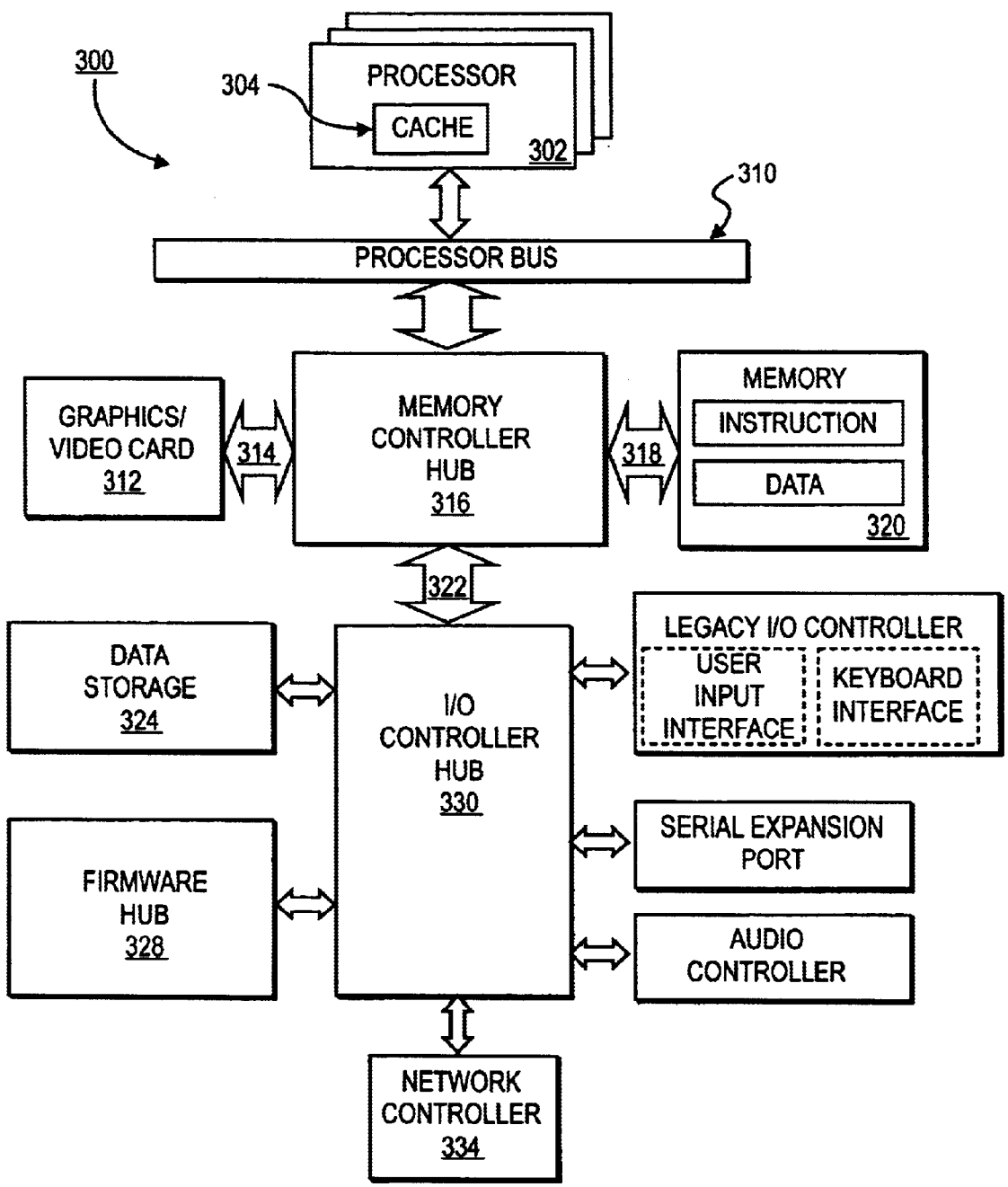
FIG. 3 is a computer system capable of using a method for practical concurrent copying garbage collecting offering minimal thread blocking times.

Referring now to FIG. 3, there is a computer system 300 that may utilize the present enhancement. Sample system 300 is representative of processing systems based on the PENTIUM®, PENTIUM® Pro, PENTIUM® II, and/or PENTIUM® III microprocessors available from Intel Corporation of Santa Clara, Calif., although other systems (including PCs having other microprocessors, engineering workstations, set-top boxes, servers, and the like) may also be used. In one embodiment, sample system 300 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

FIG. 3 is a block diagram of a system 300 of one embodiment. The computer system 300 includes a processor 302 that processes data signals. The processor 302 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 3 shows an example of an embodiment of the present invention implemented in a multiple processor system 300. However, it is understood that other embodiments may alternatively be implemented as systems having a single processor. Processors 302 are coupled to a processor bus 310 that transmits data signals between processors 302 and other components in the system 300. The elements of system 300 perform their conventional functions well known in the art.

System 300 includes a memory 320. Memory 320 may be a dynamic random access memory (DRAM) device, a static random access memory (SRAM) device, flash memory device, or other memory device. Memory 320 may store instructions and/or data represented by data signals that may be executed by processors 302. A cache memory 304 can reside inside processors 302 that stores data signals stored in memory 320. Alternatively, in another embodiment, the cache memory may reside external to the processor.

A system logic chip 316 is coupled to the processor bus 310 and memory 320. The system logic chip 316 in the illustrated embodiment is a memory controller hub (MCH). The processors 302 communicate to a memory controller hub (MCH) 316 via a processor bus 310. The MCH 316 provides a high bandwidth memory path 318 to memory 320 for instruction and data storage and for storage of graphics commands, data and textures. The MCH 316 directs data signals between processor 302, memory 320, and other components in the system 300 and bridges the data signals between processor bus 310, memory 320, and system I/O 322. The graphics card 312 is coupled to the MCH 316 through an Accelerated Graphics Port (AGP) interconnect 314.

System 300 uses a proprietary hub interface bus 322 to couple the MCH 316 to the I/O controller hub (ICH) 330. The ICH 330 provides direct connections to some I/O devices. Some examples are the audio controller, firmware hub 328, data storage 324, legacy I/O controller containing user input and keyboard interfaces, a serial expansion port such as Universal Serial Bus (USB), and a network controller 334. The data storage device 324 can comprise a hard disk drive, a floppy disk drive, a CD-ROM device, a flash memory device, or other mass storage device.

A compiler and run-time system including the present enhancement can reside in the memory 318 or data storage device 324 or both of this embodiment. In an alternative embodiment, the compiler and run-time system can be downloaded through a network. Similarly, application code can be stored in cache 304, memory 320, or a data storage device 324. Application code can also be downloaded through a network.

Although the above example describes the distribution of a Java class file via a network, Java programs may be distributed by way of other computer readable media. For instance, a computer program may be distributed through a computer readable medium such as a floppy disk, a CD ROM, a carrier wave, or even a transmission over the internet.

Using a copying collector to reorder objects can improve cache locality significantly and affect overall performance. Concurrent copying collectors need a write barrier for efficiency. The write barrier comprises operations performed when a datum (most commonly a pointer) is stored into a heap object. The operations need to be loosely synchronized with the actual update, but the synchronization requirements are generally not as stringent as for a read barrier. Generational collectors use write barriers to detect and record pointers from older to younger generations, so that upon collection the collectors can locate pointers from U (regions of memory not collected in the particular collection) to C (regions of memory collected in the particular collection) efficiently. One embodiment of the present enhancement uses more complex write barriers in some phases to bring O and N copies of objects into consistency and to assist in flipping. Some of these write barriers need to occur for all updates rather than only the updates that store pointers. The present enhancement makes a good trade-off since reads are much more common than writes, so the overall performance should be better than systems using a read barrier. Code density is also better without read barriers.

The present enhancement may also improve the performance of a real-time or embedded system. Short thread blocking times means that useful processing encounters only minimal pauses due to garbage collection. In additional, if a programmer has control over the code points at which threads can task switch, then the present algorithm can be simplified by making certain code sequences atomic such that no task switch occurs in the middle of the sequence.

A memory region may contain slots as well as non-slot data. A slot is a memory location that may contain a pointer. For one embodiment of the present invention, three distinct regions are defined:

- U (Uncollected)—A region of the heap (i.e., potentially shared among all threads) whose objects are not subject to reclamation in a particular cycle of the collector. For convenience, U also includes all non-thread-specific slots not contained in objects, such as global variables of the virtual machine itself. U also includes slots managed by interfaces such as the Java Native Interface (JNI) on behalf of code external to the virtual machine.
- C (Collected)—A region of the heap (potentially shared among all threads) whose objects are subject to reclamation in a particular cycle of the collector. C consists only of objects and has no slots not contained within an object. C is further divided into:
  - O (Old space)—Copies of objects as they existed when the collector cycle started.
  - N (New space)—New copies of objects surviving the collection.
- S (Stack)—Each thread has a separate stack, private to that thread. S regions contain slots, but no objects, i.e., there may be no pointers from heap objects into stacks. For convenience, other thread-local slots are included into S, notably slots corresponding to those machine registers containing references.

There are two other useful things to know about the definition of U and C. First, though one might scan U to find slots referring to C, a generational system usually employs a write barrier and an auxiliary data structure, such as a remembered set of U slots that may contain pointers to C objects, to avoid scanning U. Second, during collection, new objects are not allocated in the C area; rather, the nurseries being filled during collection are considered to be part of U. This affects the write barrier used by a generational collector, or requires that the nurseries be scanned for pointers to C objects. The S and U regions contain roots, which are where collection "starts" in its determination of reachable O objects.

One embodiment is divided into two major groups of phases. The first group of phases: (a) determines which O objects are reachable from root slots in the U and S regions and (b) constructs copies of the reachable O objects in N. An object is reachable if a root slot points to it, or a reachable object has a slot pointing to it. Reachability is the transitive closure of reference following, starting from roots. The two copies of any given reachable object are kept loosely synchronized. A synchronization point is a point in code, that when reached, entails a synchronization between threads. The Java programming language and the Java virtual machine have precise definitions of required synchronization points and their effects. The principal points are acquisition and release of monitor locks, and reads and writes of volatile variables. Any changes made by a thread to O objects between two synchronization points will be propagated to the N copies before passing the second synchronization point. This takes advantage of the Java virtual machine specification's memory synchronization rules so that updates to both copies need not be made atomically and simultaneously. If all mutator threads are at synchronization points, then the O and N copies will be consistent with one another at a particular phase of collection. This property between O and N space is called dynamic consistency.

The second group of phases is concerned with flipping S and U pointers so that the pointers point to N space and not O space. For one embodiment of the present enhancement, this group of phases uses a write barrier only (i.e., no read barrier). The present enhancement allows unflipped threads to access both O and N copies of objects, even of the same object. However, slightly tighter synchronization of updates to both copies may be required. More significantly, the present enhancement affects pointer equality comparisons (== in Java), since the system has to be able to respond that pointers to the O and N copies of the same object are equal from the viewpoint of the Java programmer. Comparing two non-null pointer values for equality is a relatively rare operation, so the extra performance cost may be marginal. Note that comparisons of pointers against null are unaffected and are likely the most frequent pointer comparisons performed in practice.

I. Phases of a Practical Copying Garbage Collector

The first phases described are the phases whose overall purpose is to locate all reachable O objects and create corresponding N copies for the O objects. The N copies are brought into dynamic consistency.

A. Early Phases: Achieving Dynamic Consistency

The specific early phases are: Pre-Mark, Root-Mark, Mark, Allocate, Pre-Copy, and Copy. Note that in practice a number of these phases can be combined and performed together, as described later. However, the algorithmic explanations are clearer if the phases are discussed separately and the goals and actions of each made precise.

A useful way to understand the early phases is in terms of the traditional tri-color marking rules. Under these rules, each slot and object is considered to be black (meaning marked and scanned), gray (meaning marked but not necessarily scanned), or white (meaning not marked). Slots contained within an object have the same color as the object.

There is a single rule restricting colors: a black slot may not point to a white object. For one embodiment of the present enhancement, S slots are treated as being gray, implying that these slots may contain pointers to objects of any color. Most particularly this implies that pushing or otherwise storing a reference in a stack slot does not require any work to enforce the color rule.

Initially all existing objects are considered to be white. As collection proceeds, objects progress in color from white, to gray, to black. In the present enhancement, black objects are never turned back to gray and rescanned. The goal of the three marking phases (Pre-Mark, Root-Mark, and Mark) of the collector is to color every reachable C object black. Further, any object unreachable when marking begins will remain white, and the collector will reclaim it eventually. Newly allocated objects are considered gray in the pre-mark phase and black from then on.

To ensure the no-black-points-to-white rule, the mutators need to do write barrier work as described below. The marking phase write barrier ensures that the referent of any pointer stored into an object is gray or black. However, the most subtle aspect of the marking algorithm is ensuring that eventually no S slot refers to a white object.

In the copying phases, some care is needed in copying object contents and achieving dynamic consistency since mutator threads assist in the process and thus the mutators and collector need some degree of synchronization.

1. Pre-Mark Phase

The later mark phase requires assistance from mutator threads at their write barriers. Hence, the pre-mark phase establishes additional write barrier behavior beyond the usual generational write barrier. The pseudo-code of FIG. 4A presents a write barrier including the write action.

There are at least two ways in which this write barrier might be established. If each thread has a thread-local variable, for example a dedicated branch target register referring to the current write barrier, then all the threads are processed, updating that variable. If there is a single global variable, e.g., a state variable that is tested in a write barrier subroutine, or a single global pointer in memory referring to the current write barrier routine, then that variable or pointer can be simply be updated. Since the collector is the only thread that will update the variable in question, atomic access is not specifically required. However, the next phase cannot be started until all threads are "on-board" with the new write barrier. The gray set is initially empty before the write barrier is changed in this phase.

Conditions true at the start of the phase: All objects are white. The gray set is empty. All threads have the "standard" write barrier.

Conditions true at the end of the phase: All threads have the mark phase write barrier.

Invariants of the phase: S and U slots are gray. There are no black slots referring to white objects, in particular there are no black slots or black objects, but there may be gray objects. New objects' slots are treated as being gray in this phase. Any gray C object was reachable at the start of the phase. No objects are allocated into the C region. Because there are no black slots, the no-black-points-to-white rule holds trivially.

Termination: Any thread created during or after this phase starts with the appropriate write barrier. Hence only previously existing threads have to be processed, visiting each one once. This task will eventually complete. If a single global variable can be set to activate the write barrier desired, then the task consists merely of changing that variable.

2. Root-Mark Phase

This phase iterates through all U slots that could possibly refer to C objects and "grays" any white C objects referred to by those slots. The root-mark phase "blackens" the U slots. Note that as of this phase, stores into newly allocated objects, including initializing stores, have to invoke the mark-phase write barrier. Put another way, the new U slots created when objects are allocated are treated as being "black" from here on as opposed to their treatment as "gray" in the Pre-Mark phase.

While the U region can be scanned to find the relevant slots, the remembered set data structure built by a generational write barrier can be utilized to locate the relevant slots more efficiently. The pseudo-code of FIG. 4B is for the Root-Mark Phase.

Conditions true at the start of the phase: All U slots are gray.

Conditions true at the end of the phase: All U slots are black.

Invariants of the phase: S slots are gray. All black slots are in U. Any O object grayed was reachable from a root. No objects are allocated into the O region. All threads employ the mark-phase write barrier. Black slots cannot refer to white objects.

Termination: The set of previously existing U slots is fixed at the start of the phase, so checking a slot makes progress. New slots are blackened by their initializing stores and are not the collector's responsibility. Thus allocation cannot "get ahead" of the collector in this phase.

3. Mark Phase

In this phase, the collector works from the gray set. Each gray object's slots are blackened, and then the object itself is considered black. This is represented by the fact that the object is marked but not in the gray set. The process continues until the gray set is empty.

Without an atomic mark operation there is a slight race condition between threads when adding objects to the gray set. An object can be added more than once. The race condition can be avoided if an atomic mark operation is used and the add-to-gray-set step skipped if this is not the thread that actually marked the object. Since the race condition window is small, and no harm comes from duplicates except a little bit of extra work, whether atomic marking is included in a collector is an implementation performance consideration, not a correctness issue.

The collector processes and deletes entries from the gray set. Note that the gray set is most readily implemented as a producer-consumer list, and thus synchronizing between the mutators, which only add entries, and the collector, which only removes them, is fairly easy. However, the mutators should use atomic operations to add entries since mutators may get into race conditions with each other. When the collector removes a gray set item to process it, the collector then uses the algorithm of FIG. 4C to process the item.

The mark phase write barrier is applied to each slot in the object referred to by the pointer removed from the gray set. The previously gray object is now black since all its referents are gray, and any modification of the object will continue to insure that its referents are non-white. If the gray set has duplicate entries for the object, the object is considered gray until all the duplicates are processed. Put another way, gray objects are recorded explicitly, and the black objects are simply the non-gray marked objects. To avoid scanning O later, building an explicit set of black objects may be desirable.

Marking also involves finding S pointers to O objects. At any time the collector may request a thread to scan that thread's own stack, including registers, for references to white, unmarked objects and to invoke the mark phase write barrier on them.

Scanning an individual thread's stack for pointers to white objects can be easy, but reaching the state of having no pointers to white objects in any thread stack is more difficult. This is because even after a thread's stack has been scanned, the thread can enter more white pointers into the stack since there is no read barrier preventing that from happening. The problem is using the fact that the write barrier grays a white object prior to installing in the heap any pointer to the object. For example, suppose that between a certain time t1 and a later time t2 each thread's stack has been scanned, none of the thread stacks had any white pointers, and the gray list has been empty at all times. There are now no white pointers in S or in marked O objects, and thus that marking is complete. A thread can obtain a white pointer only from a (reachable) gray or white object. There were no objects that were gray between t1 and t2, so a thread could obtain a white pointer only from a white object, and the thread must have had a pointer to that object already. But if the thread had any white pointers, the white pointers are discarded by the time the thread's stack was scanned, and thus cannot have obtained any white pointers since then. This applies to all threads, so the thread stacks cannot contain any white pointers.

The argumentation concerning reachable O objects is straightforward. The O objects initially referred to by U slots were all added to the gray set and have been processed, and since t1, the write barrier has added no additional ones. A chain of reachability from a black slot to a white object has to pass through a gray object because of the tri-color invariant. Since there are no gray objects, all reachable O objects have been marked.

The following strategies can be applied for marking. First, the collector processes the gray set until the gray set is empty. Then the collector proceeds to scan thread stacks until a stack scan adds something to the gray set. The collector then processes the gray set until the set is empty again and resumes scanning thread stacks. If the collector scans all thread stacks after the gray set becomes empty, and no items are added to the gray set by stack scanning, then marking is done. Threads that are suspended continuously since their last scan in this mark phase need not be rescanned. Not having to rescan suspended threads can be an improvement due to the presence of large numbers of threads, most of which are suspended for the short term. Likewise, if stack barriers are utilized, then old frames that have not been re-entered by a thread since the collector last scanned its stack do not have to be rescanned. (Stack barriers are described later.) Because of the possible and necessary separation of pointer stores from their associated write barriers, stack scanning appears to require that threads be brought to GC-consistent states, i.e., states where every heap store's write barrier has been executed.

Once the mark phase completes, the mark phase write barrier may be removed, though correctness is not harmed if the mark phase write barrier remains until a different write barrier is required by a later phase.

Conditions true at the start of the phase: All U slots are black. All S slots are gray.

Conditions true at the end of the phase: All U slots are black. No S slot refers to a white object. The gray set is empty. All reachable O objects are marked and black. Some black O objects have may have become unreachable since the collector cycle began. All white O objects are unreachable.

Invariants of the phase: No objects are allocated into the C region. All threads employ the mark-phase write barrier. Black slots do not refer to white objects.

Termination: The set of O objects is fixed and finite when a collector cycle starts. Assuming that any given O object is entered in the gray set only once, each time the collector scans an object removed from the gray set, an additional O object is blackened. Objects are blackened at most once, so processing gray set elements indicates progress. Likewise, if some thread stacks are scanned and white objects found, the objects are added to the gray set and progress is made.

There appear to be two possible attacks on progress in marking, both resulting from the continual creation of additional threads. One attack comes if each thread comes to the same white object, decides to make the object gray, but is suspended before the graying actually happens. This condition would result in the object being entered into the gray set multiple times, with no bound on the number of times. This first attack is called the "gray set flooding attack". If a bound is imposed on the total number of threads allowed to exist at one time, then at least one of the threads will complete its write barrier and the object will no longer be added to the gray set. The maximum number of threads bounds the number of times an object can be entered. Using atomic memory operations to mark objects also avoids the gray set flooding attack. However, in practice, duplicate gray set entries should be rare and the greater cost of an atomic marking operation may not be worthwhile.

The other attack is on stack scanning. If new threads are continually created, possibly discarding old threads to stay within the maximum number imposed to avoid the gray set flooding attack, there might always be stacks not yet scanned by the collector. However, this is not really a problem. Consider the original argument and its time span from t1 to t2. Let Old be the set of threads existing at time t1 and New be threads created between time t1 and t2. If no thread in Old referred to a white object since t1, and no objects have been added to the gray set, then no thread in New can refer to a white object. For a New thread to have a pointer to a white object, the New thread would have to load the pointer from the heap since there is no direct communication between threads. All O objects reachable from U slots are black at t1. Since the gray set remained empty, that property was true from t1 to t2. That is, all reachable O slots and all U slots were black for the whole time. Thus a New thread cannot have obtained any pointers to white objects. If a New thread is created by passing arguments from an Old thread, those arguments should be blackened as part of the thread spawning process in order to ensure that white pointers cannot "leak" from Old to New threads.

4. Overview of Allocation and Copying

The mark phases above establish which O objects are reachable. Those phases are the primary ones extended to handle Java finalization and weak pointer semantics, since those extensions to basic reachability have primarily to do with determining which objects are reachable and thus subject to copying. Once the reachable O objects are determined, an N copy is allocated for each of them during the Allocation Phase. In the Copy Phase, the O object contents are then copied to the allocated N space. The Copy Phase needs a new write barrier, to maintain dynamic consistency between the O and N copies of objects. The Pre-Copy Phase has the job of establishing that write barrier.

5. Allocation Phase

Once all reachable O objects have been marked, the collector allocates space for an N copy for each one and sets the O copy's forwarding pointer to refer to the space reserved for the N copy. The O copy is considered as being forwarded to the N copy. The format of objects must support a forwarding pointer while still allowing all normal operations on the objects. Also, installing the forwarding information has to be done carefully, so that mutator operations can proceed at any time. This is fairly easy to do if the collector uses a compare-and-swap operation and is prepared to retry the step of copying the header word and installing the forwarding address. This process is a little different from a stop-the-world collector, which can "clobber" part of the O object so long as the data is preserved in the N copy and can do so without affecting the mutator. If a header word is clobbered in the present enhancement, the mutator can follow the forwarding pointer whenever the mutator needs the moved information.

If the collector saves a list of each object it scanned in the mark phase, then the collector can use that list to find the O copies. Otherwise, the collector can scan O space to find the marked objects. While the details of how one finds marked objects is not related to correctness, good copying collector tuning leads to few O objects marked. Hence performance considerations suggest using data structures and algorithms that avoid scanning O space. If phases are combined, then techniques such as Cheney scanning obviate the need to keep a separate list of marked objects for purposes of allocation. If allocation is performed as a separate phase, then allocation can readily accomplished by the collector without mutator synchronization or assistance.

One embodiment of the algorithm of the present enhancement also requires back pointers from N objects to O objects, so that each copy of an object can be found from the other copy efficiently.

Conditions true at the start of the phase: No O objects have N copies allocated.

Conditions true at the end of the phase: Each black O object has space allocated for an N copy. The mapping between black O objects and their N copies is one-to-one and onto.

Invariants of the phase: No new objects are allocated into the C region. All reachable O objects are black. The mapping between black O objects and their N copies is one-to-one, and onto the N copies. If an O object has an N copy, the N copy has room for the O object's data.

Termination: The set of black O objects is fixed and finite when the phase starts. Each allocation step reduces the set of black O objects without N copies.

6. Pre-Copy Phase

As object contents are copied from O space to N space, the collector needs mutator assistance to insure that updates occurring after the collector's copying operation are propagated from O versions of objects to their corresponding N versions. The mark phase write barrier is replaced with the Copy Phase Write Barrier code of FIG. 4D.

Unlike most copying collector write barriers, this write barrier applies to heap writes of non-pointer values as well as of pointers. This barrier also requires work regardless of the generational relationship of the objects in the case of storing a pointer. Finally, note that a pointer in an N object always points to U or N space, not to O space. The invariant that N objects cannot refer to an O object is maintained.

Conditions true at the start of the phase: Each black O object has a unique corresponding N copy allocated. No thread has the copy phase write barrier installed. N object contents are undefined.

Conditions true at the end of the phase: Every thread uses the copy phase write barrier.

Invariants of the phase: No new objects are allocated into the C region. All reachable O objects are black. The mapping between black O objects and their N copies is one-to-one, and onto the N copies. If an O object has an N copy, the N copy has room for the O object's data. No pointer stored into an N object refers to an O object.

Termination: The set of threads existing at the start of the phase is fixed and finite, and each new thread has its write barrier set appropriately as the thread is created. Thus as each thread is switched to the new write barrier a fixed set is reduced.

7. Copy Phase

The basic accomplishment in this phase is that the contents of each black O object is copied into its corresponding N object. If a datum copied is a pointer to an O object, the pointer is first adjusted to point to the N copy of the object.

As the collector copies object contents, mutators may concurrently be updating the objects. The copy phase write barrier will cause the mutators to propagate their updates of O objects to the N copies, but the mutators can get into a race with the collector. To avoid making the mutator write barrier any slower or more complex than it already is, the burden of overcoming this race is placed upon the collector, as follows.

First, when copying a word "wo" of an O object and storing the new value "wn" in the N object, after writing "wn", the collector checks that the O value is still "wo". If the O value is not still "wo", the collector performs its copy sequence again. If mutators keep changing "wo", the collector may have to repeat its copying step. To prevent that, if the collector performs more copy cycles than some selected threshold number, the collector performs a more expensive copy cycle that will bring the copies into dynamic consistency. The collector first reads the N value "wn", then the O value "wo". The collector then computes the new N value wn', and installs the value using an atomic compare-and-swap sequence of the previous value wn and the new value wn'. This latter sequence avoids the race condition but is unnecessarily expensive for most copies.

The pseudo-code of FIG. 4E is the Collector Word Copying algorithm. If the collector executes the first return statement, then the copying operation is correct. The mutator action of writing *p is called mp. Similarly, *q is for writing *q. The collector actions rp, rq, and wq, are for reading *p and *q and writing *q, respectively. The collector actions consist of one or more <rp, wq> pairs followed by a final rp. Mutator actions for a single update consist of an <mp, mq> pair, but multiple mutator updates can come one after another. The goal is that once a collector sequence is complete, and any mutator sequence begun before the collector sequence ends, *q==forward(*p).

Consider the possible interleavings of mutator and collector actions concerning updating and copying a given slot. The <rp, wq> and <mp, mq> pairs may execute without interleaving. On the other hand, one of the following orders may occur:

<rp, mp, wq, mq>: This order gives the right outcome with no further work. The mutation occurs logically after the copying. However, when the collector does the second rp, the collector will see that p changed and will harmlessly recopy, which can occur either before or after mq.

<rp, mp, mq, wq>: In this case the logically earlier copy operation clobbers the logically later update of q. But the second rp will detect a difference and redo the copying, with the new value.

<mp, rp, wq, mq> or <mp, rq mq, wq>: The copy occurs logically after the update. Actions wq and mq write the same value. The second rp will see no change.

If another update comes along after the mq, the collector may go through another cycle of copying and checking. Since this process can happen indefinitely, the code sequence switches to an atomic update strategy. This strategy involves actions rp, rq (reading q), and csq (compare and swap on q), which gives these possible interleavings:

<rq, mp, mq, rp, csq>, <rq, mp, rp, mq, csq>, <rq, rp, mp, mq, csq>, <mp, rq, mq, rp, csq>, or <mp, rq, rp, mq, csq>: The compare-and-swap fails, leaving the logically later value from the mq. It is also possible that the update did not actually change the value, in which case the compare-and-swap will succeed, but not change the value either.

<rq, mp, rp, csq, mq> or <mp, rq, rp, csq, mq>: The compare-and-swap succeeds, installing the logically newer value. The later mq writes that same value again.

<rq, rp, mp, csq, mq>: The compare-and-swap succeeds, installing the logically older value. The later mq installs the correct final value.

Note that the cases in which the compare-and-swap succeeds are ones in which another mutator update cannot have begun—the mq happens after the csq. If, after the collector's rq and rp operations, there are further updates that (a) set q to the value read by the rq (i.e., update both p and q) and then (b) update p to some new value (but the write to q has not yet happened), then the csq will succeed. But the final mq cannot have happened before the csq or the csq would have failed. Hence the mq will happen later and q will end up with the correct value.

The compare-and-swap based copying sequence has the property that updates to q occur in the same order as to p. The re-read and possibly re-copy sequence may not update q in the same order but will give a correct final value when the sequence terminates. Mutators will not read q until after this phase is complete.

For one embodiment, Java locking semantics are relied upon to resolve possible race conditions between mutators. In particular, there is no interleaving of <mp, mq> update pairs from different threads.

Conditions true at the start of the phase: Each black O object has a unique corresponding N copy allocated. N object contents are undefined.

Conditions true at the end of the phase: N object contents are "dynamically consistent" with their (unique) O copies. More precisely, when no mutator is in the middle of write barrier code for a given slot, the N and O copies of that slot have consistent values. For non-pointer data, "consistent" means "equal". For pointer values, "consistent" means that the N value is the forwarded version of the O value.

Invariants of the phase: All threads use the copy phase write barrier. No new objects are allocated into the C region. All reachable O objects are black. The mapping between black O objects and their N copies is one-to-one, and onto the N copies. If an O object has an N copy, the N copy has room for the O object's data. No pointer stored into an N object refers to an O object.

Termination: There is a fixed and finite set of slots to be copied. The copying routine terminates after a fixed maximum time for each slot.

B. Concerning Java Mutual Exclusion

Together, the Java programming language and Java virtual machine offer means to obtain exclusive access to individual objects, via monitor locks associated with some objects. Virtual machine implementations typically achieve mutual exclusion on any given object by performing atomic memory operations on some lock word associated with the object. If mutators run during collection and the lock word of a copied object moves, the mutators have to always direct their locking related operations to the appropriate memory word.

If the lock word for an O object lies in the O region, then the lock word will eventually need to be moved, atomically, to the N region. The lock word can be moved as early as the allocation phase or as late as the Post-Flip phase. During the interval in which mutator threads may access both O and N copies of the same object, locking related operations starting with a reference to the O copy and locking related operations starting with a reference to the N copy have to end up accessing the same lock word. There are three possible places for the lock word during this interval: within the O copy, in which case N references need to "unforward" to the O copy; within the N copy, in which case O references need to forward to the N copy; and somewhere else, in which case O and N references need to proceed to the separate data structure.

For one embodiment, the following technique is utilized. Implementations of locks generally include two forms: "thin" locks, which consume only space in their object; and "fat" locks, which require additional data (e.g., a queue of waiters) and have most of that data allocated somewhere else. Thin locks of one embodiment are forwarded to N space atomically. This technique is similar to the copying sequence above: the collector copies the thin lock over, and then does a compare-and-swap on the O version to install a special forwarding value in the lock word of the object. Fat locks can be conveniently put in a memory space managed in alloc/free style. "Free" is called by the collector as necessary and by the virtual machine when a fat lock reverts to thin.

C. Later Phases

The later phases for one embodiment of the present enhancement are: Pre-Flip, Heap-Flip, Thread-Flip, and Post-Flip. The goal of these phases is systematically to eliminate O pointers that may be seen and used by a thread. The plan of the phases is as follows. First, a write barrier is installed to help keep track of places possibly containing O pointers to O objects. Next, ensure that there are no heap (U region) pointers to O objects. Then start flipping threads at will.

An invariant that U and N objects do not point to O objects is established and maintained. The flip phase write barrier, installed by the Pre-Flip phase, serves to ensure that in the future no O pointers are stored into heap objects. The Heap-Flip phase eliminates any U pointers to O objects. Unflipped threads may have pointers to O and N objects, even to the same object, but flipped threads cannot hold O pointers. In the Thread-Flip phase, each flipped thread will no longer hold O pointers. The Post-Flip phase simply restores the normal (i.e., not-during-collection) write barrier and reclaims the O region.

As long as there are any unflipped threads, all threads have to update both the O and N copies of C objects. For one embodiment, the order (O first or N first) does not matter due to the advantages of Java mutual exclusion semantics. Note that unflipped threads may access both O and N copies, even of the same object. This means that pointer equality tests such as p==q need to be a little more complex. Note that comparisons with the null pointer are unaffected. Since most pointer comparisons are probably tests for null pointers, it is unlikely that the more complex pointer equality test will have significant impact. Having distinct pointers refer to what is logically the same object may present new issues of aliases and alias analysis to compilers and hardware. If the update of the "other" copy is deferred, an issue may exist at the hardware level. For example, a field is written via pointer p in O space and if the field is read via pointer q in N space, the read might not reflect the write. Thus, a thread has to complete updates to both O and N space before proceeding to the next field read or write that might possibly touch the same field. Note that interference from other threads is not an issue (at least for programs without data races), because Java synchronization rules require locking in such cases. For programs with data races, one may need additional ordering of memory operations when executing on a multiprocessor, so as to guarantee that O and N updates of one field both occur before updates of another field. If the rule of updating both spaces before accessing possibly conflicting fields in the same thread is followed, then hardware alias detection mechanisms will work correctly. The possibility of two physical copies of the same logical object does not affect compiler alias analysis. Distinct p and q can refer to copies of the same logical object only when p and q could refer to the same physical copy. However, if the compiler inserts run-time tests of pointer equality to conditionalize code based on aliasing, then those equality tests have to allow for the possibility of physically distinct copies of the same logical object, i.e., the compiler needs to emit code for the more complex equality test.

1. Pre-Flip Phase

The pre-flip phase's job is to install the Flip Phase Write Barrier. As with other write barrier installations, the installation may either be a single global operation or involve visiting each thread and doing something to the thread.

The Flip Phase Write Barrier pseudo-code is shown in FIG. 4F. The pseudo-code for implementing pointer equality tests for one embodiment is shown in FIG. 4G. This pointer equality test assumes that the thread is not suspended in the middle of the test while the collector completes collection and a new collection starts. If a thread is suspended, then the result can comprise an O version of p but a forwarded version of q, and the test could then give the wrong answer. One fix is to make sure that threads in this code advance to the end of the equality test before collection completes. Such thread advancing requirements may apply to other pseudo-code fragments described herein as well, i.e., any that examine or update forwarding pointers.

The flip-phase write barrier must be installed before the Heap-Flip phase. Otherwise unflipped threads might write O pointers in U slots. Similarly, the pointer equality test should be installed at this time, since the Heap-Flip phase will start to expose N pointers to unflipped threads.

Conditions true at the start of the phase: N object contents are dynamically consistent with their O copies. All mutator threads use the copy-phase write barrier.

Conditions true at the end of the phase: All mutators use the flip-phase write barrier. No further O pointers will be written into U objects.

Invariants of the phase: No new objects are allocated into the C region. All reachable O objects are black, and have a unique corresponding N copy, with which they are dynamically consistent. No N object refers to an O object.

Termination: There is a fixed and finite set of threads to be processed, and processing each thread takes no more than a fixed number of operations. New threads are spawned with the new write barrier, so termination is not threatened by thread creation.

2. Heap-Flip Phase

This phase involves scanning every U slot that might contain an O pointer and fixing O pointers to refer to the N copies of the objects. Because of possible races with mutator updates, the collector employs a compare-and-swap operator. For one embodiment, failures are ignored since the mutator thread can only have written an N pointer in this phase. The code for checking and flipping each slot is in FIG. 4H.

Conditions true at the start of the phase: No store to U or N space stores an O pointer, but U objects may contain O pointers.

Conditions true at the end of the phase: U objects and N objects contain no O pointers.

Invariants of the phase: No new objects are allocated into the C region. All reachable O objects are black, and have a unique corresponding N copy, with which they are dynamically consistent. No N object refers to an O object. No stores to U or N store an O pointer because all mutators use the flip-phase write barrier.

Termination: There is a fixed and finite set of slots to be processed, and processing each slot takes no more than a fixed number of operations.

3. Thread-Flip Phase

With the write barrier set by the pre-flip phase, flipping is straightforward. To flip a given thread, all O space references in the thread's portion of S (stack and registers) are replaced with their N space forwarded versions. This step can be done incrementally using stack barriers, as mentioned for marking. The flip-heap-pointer pseudo-code for flipping S slots can also be used. Any new threads start flipped.

Conditions true at the start of the phase: S slots may refer to O objects.

Conditions true at the end of the phase: S slots do not refer to O objects.

Invariants of the phase: No new objects are allocated into the C region. All reachable O objects are black, and have a unique corresponding N copy, with which they are dynamically consistent. No N object refers to an O object. No stores to U or N store an O pointer because all mutators use the flip-phase write barrier.

Termination: There is a fixed and finite set of threads to process comprised of the threads existing at the start of the phase. Each thread's stack has a fixed number of slots. Processing each slot takes no more than a fixed number of operations.

4. Post-Flip Phase

Once all threads have been flipped, the special write barriers can be turned off and reverted back to the normal write barrier that is used when GC is not running. The collector may then visit each N copy and remove the back pointer to its O copy, and finally, reclaim O space. The information in "fat" locks may also need to be updated if those locks include back pointers to their object. The steps of one embodiment are performed in this order: (1) change the write barrier to the normal write barrier so that threads will no longer follow back pointers to O objects; (2) after ensuring that all threads are using the new write barrier and have completed any write barriers that were in progress, remove back pointers from N objects to O objects and fix "fat" locks; (3) reclaim O space.

Conditions true at the start of the phase: N objects may have back pointers to O objects. Locks may be in "expanded" ("fat") form and shared between the N and O copies of an object. All threads use the flip phase write barrier.

Conditions true at the end of the phase: No N object has a back pointer to an O object. Locks are no longer shared between N and O copies of an object. All threads use the normal write barrier.

Invariants of the phase: No S, U, or N slot refers to an O object. All allocation occurs in U space.

Termination: There is a fixed and finite set of N objects to process. There is also a fixed and finite set of threads to process (those existing at the start of the phase). Each object and thread requires a fixed amount of work.

II. Merging Phases

For one embodiment, some phases need to be strictly ordered and cannot be merged. However, a number of the earlier phases can be merged. Specifically the Root-Mark, Mark, Allocate, Pre-Copy, and Copy phases can be merged. The Pre-Mark phase necessarily precedes the new copy phase. The new copy phase is called the Replicate phase here to distinguish it from the unmerged Copy phase. The later flipping phases need to be strictly ordered or some important invariants will be violated. Since the new Pre-Mark phase installs a write barrier that is different from the old one, the new Pre-Mark phase is called the Pre-Replicate phase. This write barrier is termed the Replicate Phase Write Barrier.

A. Pre-Replicate Phase

The Pre-Replicate phase simply installs the Replicate Phase write barrier. This write barrier described by the pseudo-code in FIG. 4I. This write barrier simply combines the previous mark and copy phase write barriers. There are two strategies as to what add-to-gray-set does when the phases are combined. First, the mutators can do considerable work. Or second, the mutators can hand the work over to the collector. The work involved consists of allocating unique space for the newly grayed object and copying the object contents over. Having mutators do more work could avoid collector bottlenecks and share the work around on a multiprocessor. However, this strategy requires more synchronization unless N space is set up with several distinct areas into which objects can be copied (i.e., to avoid synchronization conflicts on allocation in N space). For one embodiment, mutators simply add to a list of new gray objects, and the collector does the allocation, forwarding, and copying. There can be multiple gray-object lists to reduce mutator synchronization bottlenecks. However, the collector has to then do more work to check the lists. The gray set is initially empty before the write barrier is changed in this phase.

Conditions true at the start of the phase: All objects are white. The gray set is empty. All threads have the "standard" write barrier.

Conditions true at the end of the phase: All threads have the replicate phase write barrier.

Invariants of the phase: S and U slots are gray. There are no black slots referring to white objects. In particular there are no black slots or black objects, but there may be gray objects. New objects' slots as treated as being gray in this phase. Any gray C object was reachable at the start of the phase. No objects are allocated into the C region. Because there are no black slots, the no-black-points-to-white rule holds trivially.

Termination: Any thread created during or after this phase starts with the appropriate write barrier. Hence, only the previously existing threads have to be worked on, visiting each thread once. This task will obviously complete.

B. Replicate Phase

In the replicate phase, mutators do nothing "special", except use the replicate phase write barrier. The collector acts as follows:

1. The collector scans root slots, heap slots (slots in U that might refer to O objects), and stack slots. The replicate-object code is called for each slot. The order in which slots are processed does not matter for correctness.
2. If there are any not yet scanned objects in N space, the collector calls scan-slot for unscanned object slots.
3. The collector acquires references from the gray set and calls forward-object for each reference.
4. The phase terminates when (a) all roots have been scanned, (b) all heap slots have been scanned, (c) all N objects have been scanned, and (d) all thread stack slots have been scanned while the gray object set remained empty.

Steps 1, 2, and 3 may be interleaved in one embodiment. Step 2 above may be accomplished using a Cheney scan. If mutators perform object allocation and forwarding, but not necessarily copying, then the Cheney scan pointers would also implicitly represent the gray set.

Understanding the formulation of the algorithm may be easier when the scheme is treated as having four colors for objects and slots: black (copied and scanned), dark gray (forwarded, not yet scanned), light gray (marked, not yet forwarded), and white (unmarked). The mutators change white objects to light gray. The collector changes objects from white or light gray to dark gray when the collector forwards the objects. The collector changes the objects from dark gray to black when the collector scans the objects. The forwarded but unscanned objects are the dark gray set. The replicate-object, forward-object, and scan-slot routines previously mentioned are in FIG. 4J.

Conditions true at the start of the phase: All objects and slots are white or light gray. The dark gray set is empty.

Conditions true at the end of the phase: All reachable O objects are black, having a unique corresponding N space copy, and the copies are dynamically consistent.

Invariants of the phase: Black slots do not point to white objects. No objects are allocated into the C region.

Termination: The root and U slots are processed only once since the write barrier will maintain the no-black-points-to-white rule thereafter and there is a fixed number of slots at the beginning of the phase. Since O space has a fixed number of objects and slots, scanning will terminate. Each attempt to complete thread stack scanning will either complete, or gray an O object, of which there are a fixed number.

III. Volatile Fields

Certain programming languages such as Java have a feature whereby a programmer can annotate a field as being "volatile". Similar to the semantics of C and C++, this feature means that each logical read (write) of the volatile field in the source code should turn into exactly one physical read (write) of the field when executed at run time. Volatile fields thus have different memory synchronization properties from ordinary fields. Ordinary fields need only be synchronized with memory at each synchronization point. The present enhancement takes advantage of the "loose" synchronization of ordinary fields.

The requirement is that volatile reads and writes appear to be totally ordered. There are several implementation strategies for avoiding inconsistencies including locking, mostly non-locking reads, truly non-locking reads, and completely non-locking reads and writes. Choosing between the various alternatives is an engineering decision that requires more knowledge of how and how often volatile fields are used in programs.

A. Locking

First, locking can be used to force a suitable ordering on accesses to volatile fields. One embodiment could have a single global lock, or locks based on memory region, or per-object, or per-field. A write would acquire the associated lock, update both copies, and then release the lock. If there are locks associated with each copy, the write should acquire the locks in a particular order, e.g., first the lock associated with the old copy and then the lock associated with the new one, to avoid deadlock. A read would acquire the associated lock, read the item, and release the lock. Such locks present several problems. For one thing, the programmer used volatile fields presumably to avoid locking in the first place. For another, the locks take additional space.

B. Mostly Non-locking Reads

Mostly non-locking reads is a second implementation strategy. If a lock is used on each field and placed physically adjacent to the field, then the application can read the lock and the field simultaneously, e.g., using a double-word read operation. If the lock is in the unlocked state, then the application can proceed to use the value, otherwise the application will acquire the lock. This strategy could speed things up, but does not work if the volatile field is itself the largest quantity that can be loaded in a single instruction.

C. Truly Non-locking Reads

Another strategy involves truly non-locking reads. Suppose that for any given field, one of the copies is the definitive copy at any given time. Thus the application starts with the old copy being definitive, and later switches to having the new copy be definitive. Each volatile field has an associated indicator that tells whether the old copy or the new copy is definitive. The indicator might be a pointer to the currently definitive field, or null if the old copy is definitive and a pointer to the new copy after the application switched to the new copy, or perhaps just a bit somewhere in the field's object. In the case of references, on a byte addressed machine a low bit in the reference itself can be used as an indicator.

If a reader can read the field and the indicator in one operation, then this third strategy proceeds similarly to mostly non-locking reads. However, the truly non-locking reads strategy accesses the new copy if needed, rather than acquiring a lock. A writer writes both copies, in some standard order, such as old then new, carefully avoiding races with other writers. An atomic memory exchange operator has to be used on the old copy so that the immediately previous value can be obtained. Then a compare-and-swap operator is used on the new copy repeatedly until the process succeeds, so that updates occur to each copy in the same order. If the reader cannot read the field and indicator at the same time, the reader should read the field first, and then the indicator. If the indicator is set, the reader should go to the new copy.

Flipping the definitive copy from the old copy to the new copy can be tricky. Flipping during the middle of a mutator write should be avoided since a reader may be redirected to the new copy before the new copy is updated. One way out is to use locks to serialize writing and flipping. In the case of fields that are as large as what can be loaded/stored in a single atomic memory operation, locks should be utilized. However, if the indicator is stored with the volatile field, then flipping can be done by setting the indicator in the old copy and then setting the indicator in the new copy, using the careful write policy of the previous paragraph. When a reader is directed to the new copy, though, the reader checks the new copy. If the indicator is not yet set, the reader uses the old copy. In the case when the reader uses the old copy, the old copy can be reread, provided that once the indicator is set writers update only the new copy.

D. Completely Non-locking Reads and Writes

The fourth strategy involves completely non-locking reads and writes to accomplish atomic reads and writes of multiple machine words given only atomic reads and writes of single words. Two copies, A and B, of each word are provided. The readers read first the A copy and then the B copy, and if the two differ, the readers restart the entire read. The writers write first all the B copies and then the A copies. This technique works for a single writer and many readers. In order for the technique to work for multiple writers, additional steps are needed. A serial number word is added to the data. Reads need to see the same serial number in A and B in order to succeed. A writer increments the serial number for A; say the new value is w. The writer waits until the B value is w−1, indicating that the previous writer has finished, and then proceeds to write, updating the B serial number last. The serial number need only have enough bits to encode the number of writers that might be waiting to write (plus one). For one embodiment, the same serial number is used for multiple fields, at the cost of restarting reads of one field when another field is written.

IV. Handling Java Finalization and Weak Pointers

The Java programming language and virtual machine support a feature known as finalization of objects: when an object is detected as garbage, if the object has a non-empty finalize method, then that method is invoked, asynchronously, before the object is reclaimed. The finalization method is run by a separate finalization thread, which can actually make the finalized object accessible again (e.g., by entering it into some global table), though such an action is considered to be poor style. More recent extensions provide richer and more complex finalization and reachability semantics, including notification when selected objects become unreachable, etc. The two schemes are distinguished by calling the first "finalization" and the later "weak pointers".

A. Handling Finalization

In finalization, the virtual machine must either sweep O space after marking, or maintain a data structure indicating the objects in each memory region (e.g., O space) that will require finalization when they become unreachable. Collection proceeds by having two marking (or copying) phases. The first phase finds the normally reachable objects. The second phase uses the auxiliary data structure to find the objects requiring finalization that are not marked. These objects, and any unmarked objects reachable from them, are then also marked, but the objects are removed from the set of live objects requiring finalization in the future. In the terminology of the Java Programming Language Specification at Section 12.6.1, the objects have been changed from being "unfinalized" to being "finalizable". The finalizable objects are entered into the finalization thread's data structure of objects needing their finalize method invoked. Thus the objects to be finalized survive one collection, and unless made reachable again the objects will be reclaimed in the collection after their finalization.

In the non-merged version of the present enhancement, the mark phase includes additional processing to mark, in a way distinguishable from the marking of live objects, the objects requiring finalization. Once the copy phase copies those objects, the algorithm of one embodiment can add the objects to the finalization thread's data structure. Little is different from the processing of objects not requiring finalization.

In the version of the present enhancement that merges phases, another pass of the replicate phase is performed, using the table of objects requiring finalization as a new set of roots. These objects are copied just like objects not requiring finalization. However, memory synchronization may not be necessary in the copying since only the collector can access these objects. After copying the objects, the collector adds them to the finalization thread's data structure. One simple method is for the collector to add none of the objects until after copying all of the objects since some of the unreachable objects may be reachable from other unreachable objects. However, adding the objects one at a time is legal, even though that may cause unreachable objects to become reachable. Hence memory synchronization cannot be skipped when copying the remaining objects requiring finalization or objects reachable from them.

B. Handling Weak Pointers

Newer versions of Java include a hierarchy of classes under the class Reference. These classes provide a variety of finalization, weak pointer, and notification semantics. Here are semantics these classes generally have in common. A Reference object includes inside a pointer to its referent, which is the object whose reachability is to be tracked. The get method can be invoked to obtain an ordinary strong pointer to the referent. The pointer can also cleared by set the pointer to null. When a Reference object is created, a ReferenceQueue can be optionally provided, where the Reference object will be enqueued when the referent object is appropriately unreachable; this is called notification. Such queues can be polled or threads can wait (with or without a timeout) for an object to be enqueued on a reference queue.

The underlying mechanisms rely on four strengths of reachability. The strengths are:

Strong reachability: This is reachability from a root via a sequence of ordinary pointers. Ordinary pointers are called "strong" in the context of finalization and weak pointers.

Guarded reachability: Guarded pointers are pointers embedded in GuardedReference objects. An object is guarded-reachable if it is not strongly reachable but can be reached from a root via a sequence of pointers each of which is strong or guarded.

Weak reachability: Weak pointers are pointers embedded in WeakReference objects. An object is weak-reachable if it is not strong-reachable or guarded-reachable, but is reachable from a root via a sequence of pointers each of which is strong, guarded, or weak.

Phantom reachability: Phantom pointers are pointers embedded in PhantomReference objects. An object is phantom reachable if it is not strong-reachable, guarded-reachable, or weak-reachable, but is reachable from a root via a sequence of pointers each of which is strong, guarded, weak, or phantom.

The various kinds of reference objects that contain these special kinds of pointers offer the following capabilities:

GuardedReference: The strength is guarded. The reference object is enqueued if the collector finds that the referent is only guarded reachable.

CachedReference: The strength is guarded. The collector automatically clears the pointer to the referent if the collector finds the referent to be only guarded-reachable. These objects are not enqueued. The get method is assumed to be able to reconstitute the referent object, e.g., by fetching or building the object again using information in other fields of the object. An example is reloading a cached Web page using the URL. This is really just an extension of GuardedReference to include reconstitution, and to clear the reference object's pointer to the referent.

SoftReference: The strength is guarded. The reference object's pointer to the referent is cleared as memory becomes scarce. The pointers should be cleared roughly in LRU (least recently used) order. Soft references are useful when caching is employed but reconstitution is not needed.

WeakReference: The strength is weak. The reference object's pointer to the referent is cleared if the referent is only weak-reachable. All weak reference objects processed in a given collection have their pointers cleared effectively atomically, before any weak reference object is enqueued.

PhantomReference: The strength is phantom. If the referent is only phantom-reachable and has been finalized, then the reference object is enqueued. The get method always returns null, so any information needed by the dequeuer needs to be present in other fields of the reference object. Phantom references are designed to support deallocation of external resources. For example, a phantom reference to a file object may be set up and the dequeuer closes the operating system file descriptor. In this example, the phantom reference object will be an instance of a subclass of PhantomReference, adding a field for the file descriptor number. While in this example ordinary finalization can be performed to achieve the same end, what phantom references add is the ability to order finalization actions: a chain of phantom references will have the finalization actions performed in reverse order of the chain.

For one embodiment of the collector four strengths of reachability are used instead of two. Here is one step-by-step procedure to mark and process objects (in the merged-phase collector, a replicate can be used in place of "mark"):

1. Mark the strongly reachable objects. In doing so, remember in a side data structure all the Reference objects encountered whose referent was not known to be strongly reachable. These objects are called the RR (remembered Reference) set.

2. Once ordinary marking completes, examine all remembered Reference objects whose strength is guarded. If their referent is marked, delete those objects from the RR set. Then, for each object of strength guarded remaining, mark its referent and all objects strongly reachable from it. If the reference object requires enqueuing, perform the enqueuing at this time. If the reference object's pointer to the referent should be cleared, also do that at this time. In the case of SoftReference objects, some objects may be cleared and some not. The approximate LRU ordering requires additional implementation details. But with respect to reachability, the objects fall into the guarded strength category.

3. Once guarded marking completes, remove from the RR set all reference objects whose strength is weak and whose referent is marked. Then for each remaining reference object of strength weak in the RR set, clear its pointer to its referent. This step needs to be done before enqueueing any reference object of strength weak.

4. Once weak marking completes, consider the reference objects of strength phantom in the RR set, removing the objects if their referent is marked. For each remaining reference object of strength phantom, one of two things has to be done. If the referent has been finalized, the pointer to the referent is cleared and the reference object enqueued. If the referent has not been finalized, the referent is enqueued for finalization as in ordinary finalization. Note that if the referent does not require finalization, the referent can simply be treated as if already finalized.

5. Once phantom marking completes, the unreachable objects needing finalization are processed as in ordinary finalization.

Finalization and weak pointer semantics are orthogonal to one embodiment of the present enhancement and thus the algorithm needs little adjustment to accommodate the semantics.

V. Implementation Considerations
A. Generational Write Barriers

In a generational collector, to avoid scanning the older generations when collecting one or more younger generations, mutator writes are tracked with a write barrier. Specifically, when object p is modified to refer to object q, that fact has to be remembered if p is in an older generation than q. Some write barrier schemes simply record something about every pointer write. For example, card marking records the region that was modified (in the example, the region containing p or the specific slot of p that changed). Eventually, or perhaps as part of the write barrier, the information is filtered to determine if an older-to-younger pointer was created, and such pointers may be remembered across collections, etc. The important thing to note about the method of the present embodiment is that, unlike most generational schemes, the write barrier has to be applied to stores that initialize pointer fields of newly allocated objects. This requirement does not arise from the age relationships of generational collection, but rather with the fact that newly allocated objects are not placed in the C region and the collector needs to know about references to C objects from outside the C region. However, the ages of regions can be arranged as follows so that a generational write barrier will remember the pointers that need to be remembered. Make the (logical) age of the nursery older than that of the O region, so that references to O objects from nursery objects will be recorded. In order to end up with the desired remembered pointers at the end of collection, arrange for the age of the N region to be older than the nursery.

While more generational write barrier work may have to be done in the present enhancement than in a collector that includes the nurseries in every collection, ensuring termination is hard if nurseries are included in C. Also, a concurrent collector will do more total work across all CPUs than a stop-the-world collector. Hence, the present enhancement can provide minimal disruption and better system utilization.

B. Refinements to Marking from Stacks

As previously discussed, marking requires finding S pointers to O objects, i.e., scanning thread stacks. At any time the collector may request a thread to scan the thread's stack, including registers, for references to white (unmarked) objects and to invoke the mark phase write barrier on the white objects. Potentially important refinements to this process may be available.

A thread need not process its entire stack at once. Rather, a thread can process its registers, top frame, and zero or more additional frames, leaving the rest of the frames for the moment. The collector can process the remaining frames, allowing the mutator to proceed with a shorter interruption. These techniques are in the style of generational stack collection.

These refinements require synchronization between the mutator thread and the collector. In particular, the collector cannot process the frame in which the mutator is running, or a frame from which the mutator has returned. Hence, for the collector to work on frames below a certain point in a thread stack, the collector should install a "stack barrier". One embodiment implements stack barriers by "hijacking" the return address into the frame, making the return address point to a routine that will synchronize with the collector appropriately. This way the mutator does not need code to check explicitly for needed synchronization. The collector will remove the stack barrier when it is done scanning, or can even move the barrier down the stack incrementally, one or more frames at a time, as it finishes scanning frames for pointers to white (unmarked) objects.

The collector can do all of the processing for suspended threads. Further, it may be possible to remember O-to-N object mappings, and to update suspended threads less often, or just as the suspended threads are awakened. The idea here is to avoid repeated scanning of the stacks of threads that are suspended for a long time. The O-to-N maps for objects referred to by suspended threads have to be remembered or updated. An alternative implementation can record the locations of a suspended thread's non-null stack references and update the references as part of each collection.

C. Flipping Threads

For one embodiment, the collector can flip suspended threads. A potentially useful extension to the algorithms laid out here would be not to flip suspended threads, since they might be suspended across a number of collections, but to flip them just once, as the threads wake up or in anticipation of their resumption, which can also be done incrementally.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method for practical concurrent copying garbage collection offering minimal thread blocking times comprising:

achieving dynamic consistency between old objects in a old memory space and new objects in a new memory space without activating a read barrier to synchronize collector and application activities during garbage collection; and flipping a first of a plurality of mutator threads to change a view for said first mutator thread from an old copy of said objects to a new copy of said objects, wherein less than all of said plurality of mutator threads are stopped while thread stacks are adjusted by said flipping, and wherein a second of said plurality of mutator threads is not blocked from concurrently executing during said flipping.

2. The method of claim 1 wherein flipping pointers comprises changing pointers referring to old objects to refer to corresponding new objects.

3. The method of claim 1 wherein achieving dynamic consistency comprises:

installing a mark phase write barrier on a thread;

scanning a root set, said root set comprising of slots and objects;

determining which objects are reachable from said root slots; and marking slots and objects.

4. The method of claim 3 wherein said marking utilizes tri-color marking rules.

5. The method of claim 4 wherein said rules comprise:

a first color representing a first status of marked and scanned;

a second color representing a second status of marked; and a third color representing a third status of unmarked.

6. The method of claim 3 wherein achieving dynamic consistency further comprises:
   allocating space for a new copy of each reachable object;
   installing a copy phase write barrier; and
   constructing copies of said reachable objects.

7. The method of claim 1 wherein flipping pointers comprises:
   installing a flip phase write barrier that keeps track of memory locations possibly containing pointers to objects;
   scanning heap memory and fixing pointers in said heap memory pointing to old objects to refer to new copies of said old objects; and
   flipping threads.

8. The method of claim 7 wherein flipping threads comprises replacing references in a thread's stack and registers that refer to old objects to refer to new copies of said old objects.

9. The method of claim 7 further comprising turning off special write barriers and reverting to a normal write barrier.

10. The method of claim 9 wherein said special write barriers comprise a mark phase write barrier, a copy phase write barrier, and a flip phase write barrier.

11. The method of claim 1 further comprising reclaiming said old memory space.

12. A method for garbage collection comprising:
   scanning a root set, said root set comprising a plurality of slots and objects without enabling a read barrier to synchronize garbage collector and application activities;
   marking said slots and said objects;
   allocating space in a new memory region for new objects;
   copying contents of old objects to new objects;
   updating for a first of a plurality of mutator threads, memory references pointing to said old objects in a old memory region to refer to said new objects, wherein less than all of said plurality of mutator threads are stopped while said updating for said first mutator thread is occurring and wherein a second of said plurality of mutator threads is not blocked from concurrently executing during said updating.

13. The method of claim 12 wherein said marking utilizes tri-color marking rules.

14. The method of claim 13 wherein said rules comprise:
   a first color representing a first status of marked and scanned;
   a second color representing a second status of marked; and
   a third color representing a third status of unmarked.

15. The method of claim 12 further comprising reclaiming memory space in said old memory region.

16. The method of claim 12 further comprising installing a write barrier.

17. The method of claim 16 wherein said write barrier comprises a mark phase write barrier, a copy phase write barrier, and a flip phase write barrier.

18. A computer readable medium having embodied thereon a computer program, the computer program being executable by a machine to perform:
   achieving dynamic consistency between old objects in a old memory space and new objects in a new memory space without activating a read barrier to synchronize collector and application activities during garbage collection; and
   flipping pointers for a first mutator thread of a plurality of mutator threads to change a view for said first thread from an old copy of said objects to a new copy of said objects, wherein less than all of said plurality of threads are stopped while said pointers for said first mutator thread are being adjusted, and wherein a second mutator thread of said plurality of mutator threads is not blocked from executing during said pointer flipping.

19. The computer readable medium of claim 18 wherein flipping pointers comprises changing pointers referring to old objects to refer to corresponding new objects.

20. The computer readable medium of claim 18 wherein achieving dynamic consistency comprises:
   installing a mark phase write barrier on a thread;
   scanning a root set, said root set comprising of slots and objects;
   determining which objects are reachable from said root slots; and
   marking slots and objects.

21. The computer readable medium of claim 20 wherein said marking utilizes tri-color marking rules.

22. The computer readable medium of claim 20 wherein achieving dynamic consistency further comprises:
   allocating space for a new copy of each reachable object;
   installing a copy phase write barrier; and
   constructing copies of said reachable objects.

23. The computer readable medium of claim 18 wherein flipping pointers comprises:
   installing a flip phase write barrier that keeps track of memory locations possibly containing pointers to objects;
   scanning heap memory and fixing pointers in said heap memory pointing to old objects to refer to new copies of said old objects; and
   flipping threads.

24. The computer readable medium of claim 18 further comprising turning off special write barriers and reverting to a normal write barrier, said special write barriers comprising a mark phase write barrier, a copy phase write barrier, and a flip phase write barrier.

25. A digital processing system having a processor operable to perform:
   achieving dynamic consistency between old objects in a old memory space and corresponding new objects in a new memory space without activating a read barrier to synchronize collector and application activities during garbage collection; and
   flipping pointers for a first application thread referring to said old objects to refer to said corresponding new objects, wherein less than all application threads of said system are stopped during garbage collection, and wherein at least one of said application threads is not blocked from executing during said pointer flipping.

26. The digital processing system of claim 25 wherein achieving dynamic consistency comprises:
   installing a mark phase write barrier on a thread;
   scanning a root set, said root set comprising of slots and objects;
   determining which objects are reachable from said root slots; and
   marking slots and objects.

27. The digital processing system of claim 26 wherein achieving dynamic consistency further comprises:
  allocating space for a new copy of each reachable object;
  installing a copy phase write barrier; and
  constructing copies of said reachable objects.

28. The digital processing system of claim 25 wherein flipping pointers comprises:
  installing a flip phase write barrier that keeps track of memory locations possibly containing pointers to objects;
  scanning heap memory and fixing pointers in said heap memory pointing to old objects to refer to new copies of said old objects; and
  flipping threads.

29. The digital processing system of claim 25 further comprising turning off special write barriers and reverting to a normal write barrier, said special write barriers comprising a mark phase write barrier, a copy phase write barrier, and a flip phase write barrier.

* * * * *

UNITED STATES PATENT AND TRADEMARK OFFICE
CERTIFICATE OF CORRECTION

PATENT NO. : 6,671,707 B1
DATED : December 30, 2003
INVENTOR(S) : Hudson et al.

It is certified that error appears in the above-identified patent and that said Letters Patent is hereby corrected as shown below:

Column 14,
Line 38, after "Similarly, ", delete "*q", insert -- mq --.

Signed and Sealed this

Thirtieth Day of March, 2004

JON W. DUDAS
*Acting Director of the United States Patent and Trademark Office*